US 6,205,459 B1

United States Patent
Sogo

(10) Patent No.: US 6,205,459 B1
(45) Date of Patent: *Mar. 20, 2001

(54) DIGITAL SIGNAL PROCESSOR AND DIGITAL SIGNAL PROCESSING SYSTEM INCORPORATING SAME

(75) Inventor: Akira Sogo, Hamamatsu (JP)

(73) Assignee: Yamaha Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/990,100

(22) Filed: Dec. 12, 1997

(30) Foreign Application Priority Data

Dec. 18, 1996 (JP) .................................... 8-338712
Dec. 18, 1996 (JP) .................................... 8-338713
Dec. 18, 1996 (JP) .................................... 8-338714

(51) Int. Cl.$^7$ ...................................... G06F 7/38
(52) U.S. Cl. ........................................ 708/490
(58) Field of Search .............................. 708/490, 508, 708/520, 521, 523, 524, 603, 501, 518

(56) References Cited

U.S. PATENT DOCUMENTS

| 4,811,267 | * | 3/1989 | Ando et al. ...................... 708/490 |
| 4,996,661 | * | 2/1991 | Cox et al. ........................ 708/508 |
| 5,175,702 | * | 12/1992 | Beraud et al. .................... 708/523 |
| 5,179,531 | * | 1/1993 | Yamaki ............................ 708/490 |
| 5,241,493 | * | 8/1993 | Chu et al. ........................ 708/501 |
| 5,260,897 | * | 11/1993 | Toriumi et al. ................... 708/524 |
| 5,757,685 | * | 5/1998 | Ohuchi ............................ 708/518 |
| 5,822,609 | * | 10/1998 | Richter ........................... 708/490 |
| 5,892,696 | * | 4/1999 | Kozu .............................. 708/490 |

* cited by examiner

Primary Examiner—Tan V. Mai
(74) Attorney, Agent, or Firm—Morrison & Foerster

(57) ABSTRACT

There is provided a digital signal processor. A bus transfers data to be processed by an arithmetic operation unit and results of arithmetic processing by the arithmetic operation unit. At least one accumulator holds the results of the arithmetic processing by the arithmetic operation unit and delivers the results to the bus. A bypass device delivers the results by bypassing the at least one accumulator.

12 Claims, 10 Drawing Sheets

FIG.2
PRIOR ART

| INSTRUCTION | mr=reg_a*reg_b | reg_a=acc0+=reg_a*reg_b | reg_a=acc0+=reg_c*reg_d |
|---|---|---|---|
| STEP1 | mr=reg_a*reg_b | | reg_a=reg_c,reg_b=reg_d |
| STEP2 | acc0=acc0+mr | | mr=reg_a*reg_b |
| STEP3 | reg_a=acc0 | | acc0=acc0+mr |
| | | | reg_a=acc0 |

FIG.7

| INSTRUCTION | reg_a=acc0+=reg_a*reg_b | reg_a=reg_a+reg_b | reg_a=acc0+=reg_c+reg_d |
|---|---|---|---|
| STEP1 | mr=reg_a*reg_b | NOP(delay) | reg_a=reg_c,reg_b=reg_d |
| STEP2 | acc0=acc0+mr | acc0=reg_a+reg_b | acc0=reg_a+reg_b |
| STEP3 | reg_a=acc0 | reg_a=acc0 | reg_a=acc0 |

DIGITAL SIGNAL PROCESSOR AND DIGITAL SIGNAL PROCESSING SYSTEM INCORPORATING SAME

BACKGROUND OF THE INVENTION

1. Field of the Invention

This invention relates to a digital signal processor (DSP) for carrying out signal processing under the control of a control processor and a digital signal processing system including the control processor and the DSP.

2. Prior Art

FIG. 1 shows the arrangement of a conventional DSP that carries out signal processing under the control of a control processor. In the figure, symbols C and D designate external registers which are storage means for storing input data to be processed by the DSP, and non-final and final results of the processing.

A multiplication/addition block 100 is connected to the external registers C and D via buses 13 and 14. The multiplication/addition block 100 is comprised of a multiplication/addition unit 10 for executing arithmetic (or arithmetic-logic) operations on input data supplied via the buses 13 and 14, and two accumulators ACC0 and ACC1 for storing results of the arithmetic operations by the multiplication/ addition unit 10.

The multiplication/addition unit 10 is comprised of two internal registers A and B, a multiplier 11, and an ALU (arithmetic-logic unit) 12. The internal registers A and B are for temporarily storing input data to be used in the arithmetic (or arithmetic-logic) operations by the ALU 12. Input data used for a multiplication operation is supplied to the multiplier 11 necessarily via the bus 13 or 14 through the internal register A or B, while input data for an arithmetic (or arithmetic-logic) operation other than a multiplication is supplied to the ALU 12 via the bus 13 or 14 through the internal register A or B.

The ALU 12 carries out arithmetic (or arithmetic-logic) operations on input data supplied from the internal registers A, B, the multiplier 11 and/or the accumulators ACC0, ACC1. The accumulators ACC0, ACC1 are for storing results of the arithmetic operations by the ALU 12. The data written into the accumulators ACC0, ACC1 are delivered to the bus 14 or again input to the ALU 12.

In FIG. 1, the buses and other signal lines are shown with numerals, such as 24 and 48, which indicate the bit widths of these signal lines. As shown in the figure, the buses 13, 14 and the output signal lines from the internal registers A, B each have a bit width of 24 bits, while a signal line from the multiplier 11, which outputs results of multiplication of 24-bit data by 24-bit data, has a bit width of 48. A signal line from the ALU 12, which occasionally accumulates output data from the multiplier 11, i.e. a result of a multiplication operation thereof, which has a bit width of 48 bits, has a bit width of 56 with an overhead of 8 bits added to the bit width of the output data from the multiplier 11.

The component elements and parts of the DSP described above are controlled by a program stored in advance in memory means, by so-called pipeline control. That is, assuming, for instance, that the DSP carries out convolution of time-series sample data with a predetermined sequence of filter coefficients, this convolution operation is carried out in the following manner:

First, at a certain clock timing, the multiplier 11 multiplies a first set of sample data and a coefficient stored in the internal registers A and B, respectively, and delivers a result of the multiplication (first multiplication) to the ALU 12. At the same time, a second set of sample data and a coefficient are written into the internal registers A and B, respectively.

Then, at the next clock timing, the result of the first multiplication is written from the ALU 12 e.g. into the accumulator ACC0, and at the same time a result of multiplication of the second set of the sample data and the coefficient (second multiplication) is supplied from the multipliers 11 to the ALU 12 and further a third set of sample data and a coefficient are written into the internal registers A and B.

Then, at the next clock timing, the result of the first multiplication delivered from the accumulator ACC0 and the result of the second multiplication delivered from the multiplier 11 are added together (i.e. accumulated) by the ALU 12, and a result of this addition is written into the accumulator ACC0. At the same time, a result of multiplication of the third set of the sample data and the coefficient (third multiplication) is delivered from the multiplier 11 to the ALU 12, and further a fourth set of sample data and a coefficient are written into the internal registers A and B.

Hereafter, multiplication of sample data and a coefficient, and accumulation of a result of the multiplication are repeatedly carried out in the same manner. Then, when multiplication operations of all sets of sample data and coefficients and accumulation of all results of the multiplication operations are completed, a result of this convolution operation, which is obtained at this time point as contents of the accumulator ACC0, is delivered to the bus 14, from which it is supplied to an external device.

Thus, arithmetic operations constituting a convolution operation, such as a multiplication operation and an addition operation, are carried out in parallel by respective devices, which enable the arithmetic operations to be executed efficiently.

Although the operation of the DSP is described above by referring to an example of the convolution operation, there is a case where a further multiplication operation is carried out on output data from the multiplication/addition unit 10, depending on kinds of arithmetic processing to be carried out. In this case, the output data from the multiplication/addition unit 10 is delivered via the accumulator ACC0 or ACC1 to the bus 14, from which it is written into the internal register A or B of the multiplication/addition unit 10.

In the conventional DSP, when the ALU 12 has carried out an arithmetic operation, the ALU 12 cannot start the next arithmetic operation before a result of the arithmetic operation is stored in the accumulator ACC0 or ACC1. Therefore, if the ALU 12 has completed an arithmetic operation before results of its preceding arithmetic operations written into the accumulators ACC0 and ACC1 are transferred to another device, the ALU 12 cannot write the result of the new arithmetic operation into any of the accumulators ACC0 and ACC1, so that the ALU 12 has to wait starting the next arithmetic operation until the accumulator ACC0 or ACC1 becomes available.

Further, some kinds of arithmetic processing require lots of arithmetic operations to be executed within a predetermined time period. When such a kind of arithmetic processing is executed by the DSP, if the start of the next arithmetic operation is delayed due to unavailability of the accumulators ACC0 and ACC1, there can be a case where all the required arithmetic operations cannot be completed within the predetermined time period. Conventionally, in such a case, data stored in one accumulator ACC0 or ACC1 is transferred to one of the external registers C and D, and a result of an arithmetic operation by the ALU 12 is stored in the one accumulator ACC0 or ACC1 which is made available by the transfer of the data therefrom, thereby enabling the ALU 12 to start the next arithmetic operation. In general, however, an accumulator of this kind has a bit accuracy corresponding to the bit width of 56 bits which is higher than a bit accuracy required of data processed by the DSP, which corresponds to the bit width of 24 bits, and hence if the contents of the accumulator are once written into an external register, this degrades the bit accuracy of the data, and in the worst case the data itself can be lost.

Further, there can be a case where the accumulator ACC0 or ACC1 suffers from an overflow during processing by the DSP. If the contents of this accumulator are delivered to the bus 14, the data can be lost by operation of an overflow-protect circuit if it is arranged in the path of delivery of the contents of the accumulator to the bus.

In the conventional DSP, it takes different time periods to execute arithmetic operations of identical contents, depending on whether the arithmetic operations are executed by using internal registers or by using external registers. FIG. 2 shows an example of two instructions for execution of arithmetic operations of identical contents by using internal registers and by using external registers, respectively.

First, an instruction shown in a left-hand column of FIG. 2, i.e. "reg_a=acc0+=reg_a*reg_b", which means "Multiply data stored in the internal register A by data stored in the internal register B, store the sum of the resulting product and data stored in the accumulator ACC0, in the accumulator ACC0, and store this data stored in the accumulator ACC0 in the internal register A", is carried out by sequentially executing the following three steps:

Step 1: The multiplier 11 multiplies the data stored in the internal register A by the data stored in the internal register B;

Step 2: The ALU 12 adds together the data stored in the accumulator ACC0 and the product from the multiplier 11, and the resulting sum is stored in the accumulator ACC0; and Step 3: The data stored in the accumulator ACC0 is stored in the internal register A.

Each of the above steps is carried out over one clock, and therefore it takes a total of three clocks to carry out the above instruction.

In contrast, an instruction shown in a right hand column of FIG. 2, i.e. "reg_a=acc0+=reg_c*reg_d", which means "Multiply data stored in the external register C by data stored in the external register D, store the sum of the product and data stored in the accumulator ACC0, in the accumulator ACC0, and store this data stored in the accumulator ACC0 in the internal register A", is identical in contents of arithmetic operations to the above-mentioned instruction, but it takes a total of four clocks to carry out the instruction, since it is required to sequentially execute the following four steps:

Step 1: Data stored in the external register C is transferred to the internal register A, and data stored in the external register D to the internal register B;

Step 2: The multiplier 11 multiplies the data stored in the internal register A by the data stored the internal register B;

Step 3: The ALU 12 adds together the data stored in the accumulator ACC0 and the product from the multiplier 11, and the resulting sum is stored in the accumulator ACC0; and Step 4: The data stored in the accumulator ACC0 is stored in the internal register A.

That is, the arithmetic operations carried out by using the external resisters require transfer of data from the external registers to the internal registers and hence it takes one clock longer to complete the arithmetic operations than when arithmetic operations of the identical contents are carried out by using the internal registers. Although in the above example, multiplications are carried out, even in a case where additions are carried out, similarly there arise a difference in processing time equivalent to one clock between when data in the external internal registers are added together and when data in the internal registers are added together.

As described above, according to the conventional DSP, even if arithmetic operations of identical contents are carried out, it takes different time periods to carry out the arithmetic operations, depending on whether internal registers or external internal registers are used. This makes it necessary to carry out timing adjustment, such as changing timing of start of execution of each arithmetic operation (changing a bus request line number) depending on whether the arithmetic operation uses internal registers or external internal registers, rendering timing designing of the program even more difficult to carry out. For example, if an instruction for arithmetic operations using the external registers C and D is first carried out, and then another instruction for arithmetic operations using the internal registers A and B is carried out one clock later, there arises an inconvenience that results of multiplications carried out according to these instructions are delivered to the bus 14 at the same timing. In addition to such an inconvenience related to the timing of outputting results of arithmetic operations carried out according to instructions, there arises, depending on how a program is written, an inconvenience that data which is prepared by executing a preceding instruction and stored in an accumulator is overwritten by data prepared by executing another instruction subsequent to the preceding instruction if this data is written into the accumulator before the data prepared by the preceding instruction is delivered from the accumulator to a proper destination. Therefore, the programmer has to be very careful that instructions of a program are each carried out at such a suitable timing as will not cause the above-mentioned inconveniences, by always confirming a time period required to execute each instruction. This requires a great deal of labor of the programmer.

FIG. 3 shows the arrangement of a digital signal processing system comprised of a DSP of a kind described above and a control processor. More specifically, the digital signal processing system is comprised of a DSP 1, a RISC (reduced instruction set computer)-CPU (central processing unit) 2, and a RAM (random access memory), all built in a single chip.

The RAM 3 is a dual port RAM which can be accessed both by the DSP 1 and the RISC-CPU 2. The DSP 1 is provided with an MMU (memory management unit) 15 for controlling writing of data into the RAM 3 and reading of data therefrom. Further, the RISC-CPU 2 is also provided with an MMU similar to the MMU 15. The RAM 3 is used not only as a work RAM used both by the DSP 1 and the RISC-CPU 2 but also as means for passing data between the DSP 1 and the RISC-CPU 2.

The DSP 1 is identical in construction with that described above with reference to FIG. 1 except that the external registers C and D are connected to the MMU 15, and therefore detailed description thereof is omitted.

When data is transferred between the DSP 1 and the RISC-CPU 2, the external registers C and D are used by the DSP 1 as means for storing data to be transferred therefrom to the RISC-CPU 2 and vice versa. More specifically, data to be transferred from the DSP 1 to the RISC-CPU 2 is stored in advance of the transfer in the register C or D, and then the MMU 15 stores the data stored in the register C or D at desired addresses within the RAM 3. The data stored in the RAM 3 is subsequently read by the MMU of the RISC-CPU 2. On the other hand, data to be transferred from the RISC-CPU 2 to the DSP 1 is first stored in the RAM 3, and the data stored in the RAM 3 is read by the MMU 15 of the DSP 1 and stored in the register C or D, for use in arithmetic operations or the like.

FIG. 4 shows another type of digital signal processing system, which is distinguished from the FIG. 3 digital signal processing system in that the external registers C and D of the DSP 1 are connected to the RISC-CPU 2 and a RAM 5 via a bus 4. According to this arrangement of the system, the RISC-CPU 2 directly writes data in the external registers C, D, whereby the data is transferred from the RISC-CPU 2 to the DSP 1, while on the other hand the RISC-CPU 2 reads data stored in the registers C and D, whereby the data is transferred from the DSP 1 to the RISC-CPU 2. The RAM 5 is a single port RAM which is connected to the bus 4 and used by the DSP 1 and the RISC-CPU 2 as a work RAM.

Now, to carry out a multiplication/addition operation by the conventional digital signal processing system shown in FIG. 3, two pieces of data are required for each multiplication/addition operation. However, the DSP 1 can only read out one piece of data from the RAM 3 per one reading operation, so that two reading operations are required to obtain data required by one multiplication/addition operation. This has been an obstacle to continuous high-speed execution of multiplication/addition operations.

One typical use of the digital signal processing system is a filtering operation in which externally-supplied time-series sample data are convolved with a predetermined sequence of coefficients. In most cases, one of two pieces of data for a multiplication/addition operation is data which incessantly varies, while the other is data of coefficients which are fixed in value. However, in the FIG. 3 system, the MMU 15 of the DSP 1 uniformly controls reading of two kinds of data which are thus different in characteristics, which imposes much burden on the MMU 15 and forms a bottle neck to efficient supply of data and coefficients to the arithmetic operations of multiplication/addition. In view of the efficiency of the processing, it is desirable that data which is incessantly updated and data of coefficients having fixed values should be efficiently read under different types of reading control suitable for their respective different characteristics. However, insofar as the common RAM is used for managing the storing of such data and coefficients, it is very difficult to carry out such different types of reading control.

On the other hand, in the FIG. 4 digital signal processing system, data required by the DSP for multiplication/addition operation are written into the external registers C and D by the RISC-CPU 2. However, these external registers C, D are connected to the RISC-CPU 2 via the common bus 4, so that the data has to be written into these registers through two reading operations separately carried out. Therefore, the DSP 1 has to wait for the RISC-CPU 2 to carry out writing of data two times before it starts the arithmetic operations of multiplication/addition.

Further, when the RISC-CPU 2 and the DSP 1 are interfaced by way of the registers C and D as in the FIG. 4 system, the RISC-CPU 2 and the DSP 1 are required to operate such that close relationship is maintained therebetween, which complicates control to be executed by each of these devices.

SUMMARY OF THE INVENTION

It is a first object of the invention to provide a DSP (digital signal processor) which is improved in accuracy, processing speed, facility of programming, etc., namely, improved in performance as a whole, as well as a digital signal processing system incorporating the digital signal processor.

It is a second object of the invention to provide a DSP which is capable of starting a new arithmetic operation even when results of completed arithmetic operations cannot be written into accumulators which already store data.

It is a third object of the invention to provide a DSP which does not require different time periods to execute arithmetic operations depending on whether the arithmetic operations are each to be carried out by using internal registers or by using external registers, and hence facilitates programming therefor.

It is a fourth object of the invention to provide a digital signal processing system which is capable of efficiently supplying data required in carrying out arithmetic operations from a control processor thereof to a DSP thereof.

To attain the first and second objects, according to a first aspect of the invention, there is provided a digital signal processor comprising an arithmetic operation unit, a bus that transfers data to be processed by the arithmetic operation unit and results of arithmetic processing by the arithmetic operation unit, at least one accumulator that holds the results of the arithmetic processing by the arithmetic operation unit and delivers the results to the bus, and a bypass device that delivers the results by bypassing the at least one accumulator.

Preferably, the bypass device comprises a delay element that delays delivery of the results of the arithmetic processing by the arithmetic operation unit to the bus, the delay element delivering the results to the bus at the same timing that the results would be delivered by way of the at least one accumulator.

More preferably, a digital signal processor includes at least one external register connected to the bus, for storing the data to be processed by the arithmetic operation unit, the arithmetic operation unit having at least one internal register connected to the at least one external register via the bus, the data to be processed by the arithmetic operation unit being transferred from the at least one external register to the at least one internal register by way of the bus.

Further preferably, the digital signal processor carries out a filtering operation, the at least one external register comprising a plurality of external registers, the at least one internal register comprising a plurality of internal registers, one of the external registers and one of the internal registers each storing time-series data, while another one of the external registers and another one of the internal registers each storing filter coefficients.

To attain the first and third objects, according to a second aspect of the invention, there is provided a digital signal processor including an arithmetic operation unit, at least one internal register connected to the arithmetic operation unit, and at least one external register, the arithmetic operation unit carrying out arithmetic processing by receiving data stored in the at least one internal register to carry out an arithmetic operation using the at least one internal register, and receiving data stored in the at least one external register to carry out an arithmetic operation using the at least one external register.

The digital signal processor according to the second aspect of the invention is characterized by comprising a path commonly used for transfer of the data stored in the at least one internal register for the arithmetic operation using the at least one internal register and the data stored in the at least one external register for the arithmetic operation using the at least one external register, and a variable delay device interposed in the path, wherein based on changeover of the delay time of the variable delay device, the arithmetic operation unit carries out the arithmetic processing in a predetermined constant time period irrespective of whether the arithmetic processing is the arithmetic operation using the at least one internal register or the arithmetic operation using the at least one external register.

Preferably, the digital signal processor includes a bypass device that delivers the data stored in the at least one external register to the arithmetic operation unit by bypassing the at least one internal register when the arithmetic operation using the at least one external register is carried out by the arithmetic operation unit.

Preferably, the arithmetic operation unit includes a multiplication device having an output, and an addition device connected to the output of the multiplication device, the multiplication device carrying out a multiplication operation only for the arithmetic operation using the at least one internal register.

Preferably, the digital signal processor includes at least one accumulator that holds results of the arithmetic processing by the arithmetic operation unit, and a bus connected to the at least one external register, the at least one internal register, and the at least one accumulator, for transfer of the data stored in the at least one internal register and the at least one external register for the arithmetic processing by the arithmetic operation unit and the results of the arithmetic processing by the arithmetic operation unit.

More preferably, the digital signal processor carries out a filtering operation, the at least one external register comprising a plurality of external registers, the at least one internal register comprising a plurality of internal registers, one of the external registers and one of the internal registers each storing time-series data, while another one of the external registers and another one of the internal registers each storing filter coefficients.

To attain the first and fourth objects, according to a third aspect of the invention, there is provided a digital signal processing system comprising a control processor, a signal processor that carries out signal processing under control of the control processor, a plurality of dual port RAM's that pass data between the control processor and the signal processor, the dual port RAM's each having two of ports, and a bus to which the control processor and the dual port RAM's are connected, the control processor having a first memory management unit connected to one of the ports of each of the dual port RAM's via the bus, for transfer of data to and from a selected one of the dual port RAM's, the signal processor having a plurality of second memory management units each connected to another one of the ports of the each of dual port RAM's, for transfer of data to and from the each of the dual port RAM's independently of each other.

Preferably, the digital signal processing system carries out a filtering operation, the signal processor having an arithmetic operation unit, a bus that transfers data to be processed by the arithmetic operation unit and results of arithmetic processing by the arithmetic operation unit, a plurality of external registers having the second memory management devices, a plurality of internal registers connected to the external registers via the bus, one of the external registers and one of the internal registers each storing time-series data, while another one of the external registers and another one of the internal registers each storing filter coefficients.

The above and other objects, features and advantages of the invention will become more apparent from the following detailed description taken in conjunction with the accompanying drawings.

BRIEF DESCRIPTION OF THE DRAWINGS

FIG. 2 shows a table which is useful in explaining operations of the DSP 2 according to respective instructions for carrying out arithmetic operations which are identical in contents but different in respect of the use of internal or external registers to carry out the arithmetic operations;

FIG. 7 shows a table similar to that shown in FIG. 2, which is useful in explaining operations of the FIG. 6 DSP;

DETAILED DESCRIPTION

Figure 1:
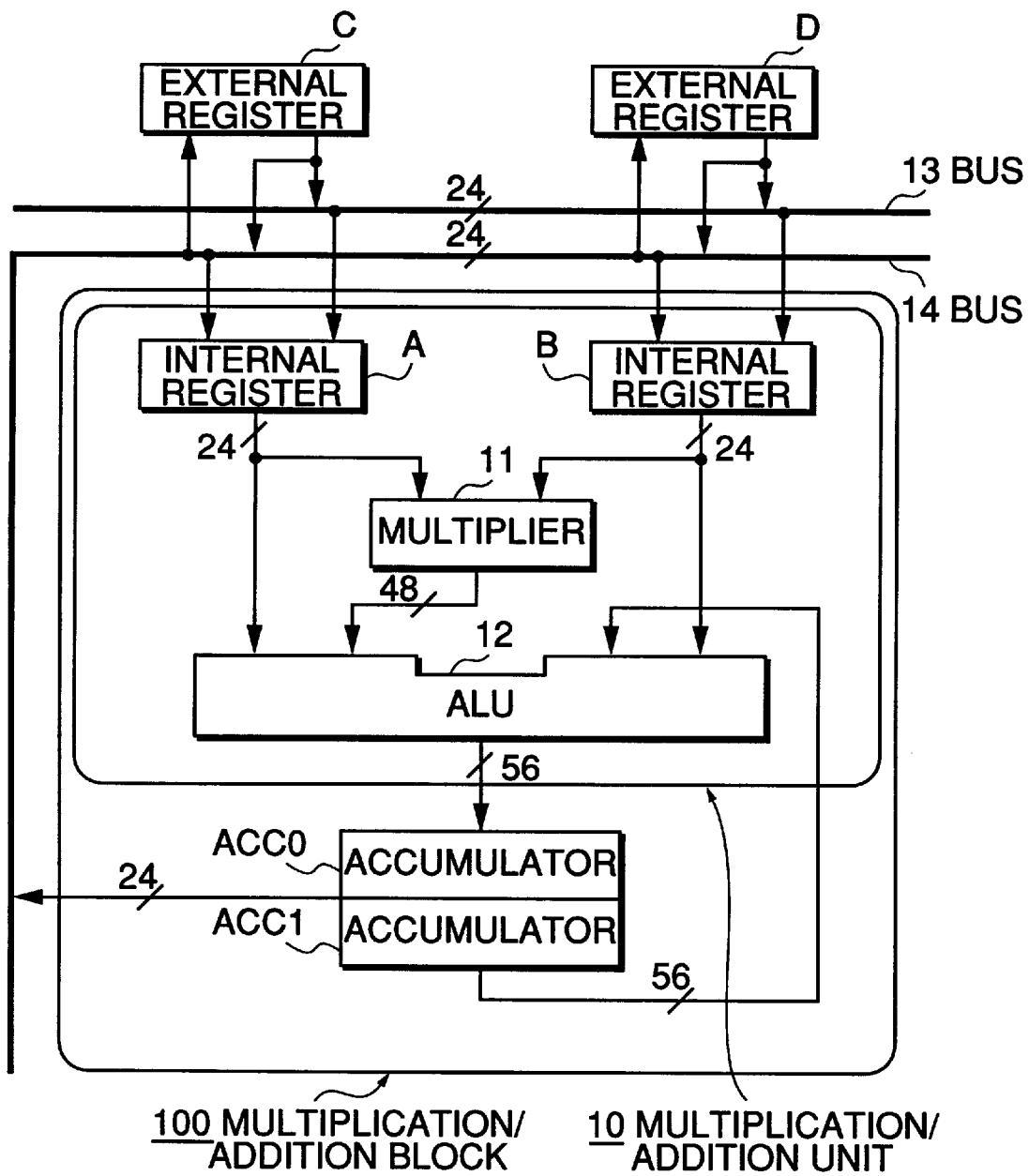
FIG. 1 is a block diagram showing the arrangement of a conventional DSP.

Now, the invention will be described in detail with reference to drawings showing embodiments thereof.

In figures showing the embodiments of the invention, elements and parts corresponding to those of the prior art described hereinbefore are designated by identical reference numerals, detailed description of which is omitted.

A first embodiment of the invention will now be described, which is capable of more efficiently carrying out arithmetic operations to thereby enhance the performance of the DSP.

Figure 5:
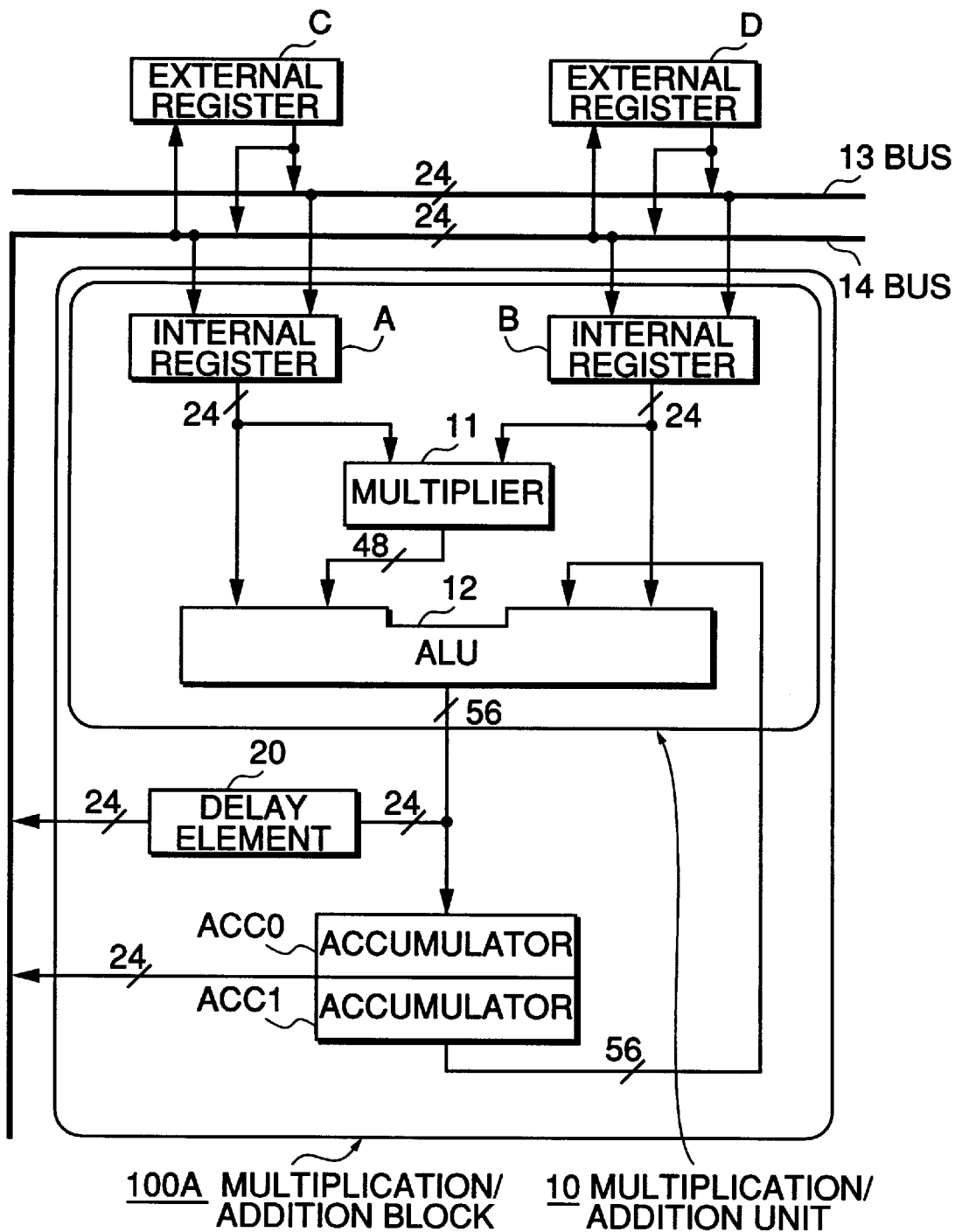
FIG. 5 is a block diagram showing the arrangement of a DSP according to a first embodiment of the invention.

Referring first to FIG. 5, there is shown the arrangement of a 24-bit fixed-point DSP. This embodiment is distinguished from the conventional DSP described hereinbefore with reference to FIG. 1 in which results of arithmetic operations by the multiplication/addition unit 10 within the multiplication/addition block 100 are delivered to the bus 14 necessarily via the accumulator ACC0 or ACC1, in that a multiplication/addition block 100A is provided with a delay element 20 as an additional element, which functions as means for bypassing the accumulators ACC0 and ACC1, via which results of arithmetic operations by the multiplication/ addition unit 10 can be directly delivered to the bus 14. The delay element 20 has a delay time thereof set such that a time period over which data is input to the internal register A or B and processed and the processed data is delivered via the accumulator ACC0 or ACC1 to the bus 14 is equal to a time period over which data is input to the internal register A or B and processed and the processed data is delivered via the delay element 20 to the bus 14.

According to this arrangement of the DSP, even when data which has been not yet transferred is still stored in the accumulator ACC0 or ACC1 and hence new results of arithmetic operations cannot be written therein, the results of the arithmetic operations can be delivered to the bus 14 via the delay element 20. Therefore, it is possible for the multiplication/ addition unit 10 to start a new arithmetic operation with data of results of preceding arithmetic operations being stored in the accumulators ACC0 and ACC1.

That is, in actuality, all the results of arithmetic operations output from the multiplication/ addition unit 10 need not be written into the accumulators ACC0 and ACC1, but what is required to be written thereinto is only data which is required to be returned to the ALU 12 for an addition (accumulation) operation of the data and a new result of a multiplication operation by the multiplier 11. According to the present embodiment, data which are not to be accumulated, i.e. data to be delivered to an external device, data to be stored in the external register C or D, or data to be again input to the internal register A or B, can be directly delivered to the bus 14 via the delay element 20 as means for bypassing the accumulators ACC0 and ACC1. Therefore, the ALU 12 of the multiplication/addition unit 10 can start a new arithmetic operation even when the accumulators ACC0 and ACC1 are unavailable at the time a preceding arithmetic operation has been completed, which enable arithmetic operations to be efficiently carried out.

Further, according to the present embodiment, it is not required to transfer data stored in the accumulator ACC0 (or ACC1) to the external register C (or D) before the ALU 12 starts a new arithmetic operation, thereby preventing data stored in the accumulator from becoming degraded in bit accuracy or being lost.

Moreover, according to the present embodiment, a result of an arithmetic operation by the multiplication/addition unit 10 is delivered via the delay element 20 to the bus 14 at the same timing that the same result would be delivered via the accumulator ACC0 (or ACC1) to the bus 14, so that an instruction can be issued which instructs transfer of an output from the multiplication/addition unit 10 via the delay element 20 to a memory device or the internal register A or B at the same timing that data which would be obtained by the same arithmetic operation and then stored in the accumulator ACC0 (ACC1) is delivered to the memory or the internal register A or B. That is, a program adapted to the DSP according to the present embodiment can be composed so as to employ the timing of issuing instructions which is the same as one by the conventional DSP. In a case where this advantage over the prior art is not needed, a three-state buffer may be employed instead of the delay element 20, whereby output data from the multiplication addition unit 10 may be directly delivered to the bus 14.

Next, a second embodiment of the invention will be described, which is capable of facilitating programming to thereby enhance the performance of the DSP.

Figure 6:
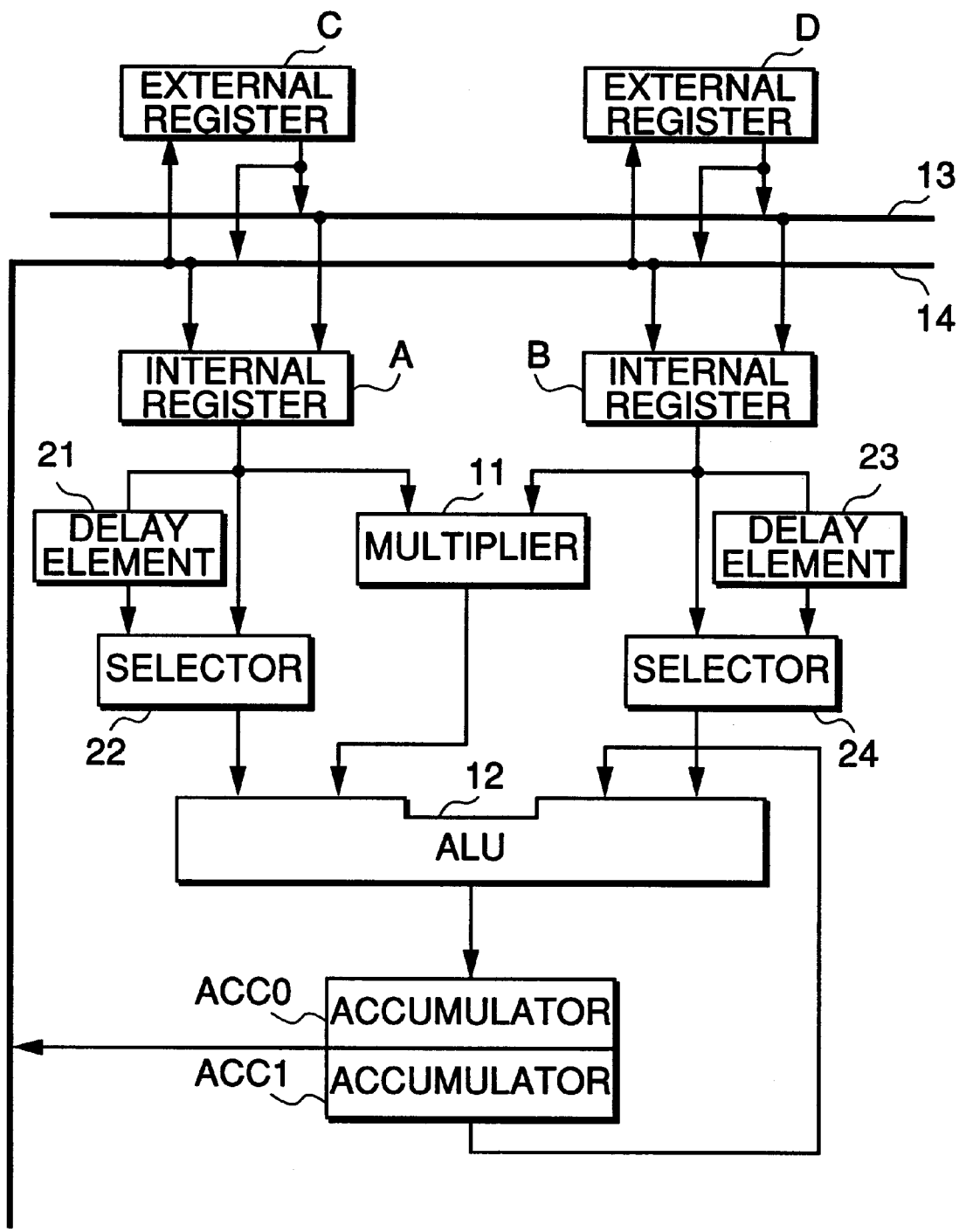
FIG. 6 is a block diagram showing the arrangement of a DSP according to a second embodiment of the invention.

FIG. 6 shows the arrangement of a DSP according to the second embodiment. In this embodiment, data paths from the internal registers A and B to the ALU 12 are commonly provided for data to be processed by using the internal registers and data to be processed by using the external registers. This embodiment is distinguished from the conventional DSP described hereinabove with reference to FIG. 1 in that as shown in FIG. 6, variable delay means comprised of a delay element 21 and a selector 22 and variable delay means comprised of a delay element 23 and a selector 24 are interposed in the respective data paths. The delay elements 21 and 23 of the variable delay means effect a delay of one clock. The selector 22 (or 24) of the variable delay means selects between output data from the internal register A (or B) and output data from the delay element 21 (or 23), and delivers the selected output data to the ALU 12.

Which data is to be selected by each of the selectors 22 and 24 of the variable delay means can be determined depending on the kind of an instruction to be executed by the DSP, and the selection is carried out according to a control signal generated by an instruction decoder, not shown. More specifically, when an arithmetic operation is carried out by using the external registers, control signals are supplied to the selectors 22 and 24 for selecting output data from the internal register A and B, while when an arithmetic operation is carried out by using the internal registers, control signals are supplied to the selectors 22 and 24 for selecting output data from the delay elements 21 and 23.

Further, according to the present embodiment, instructions for multiplication operations using the external registers are excluded from each set of instructions, that is, instructions for multiplication operations are necessarily carried out by using the internal registers. This restriction is intended to execute all instructions over an equal time period.

FIG. 7 shows an example of instructions useful in describing operations of the DSP according to the present embodiment. Now, the operation of the DSP will be described with reference to FIG. 7.

First, an instruction in a left-hand column of FIG. 7 is the same instruction that was described hereinabove with reference to FIG. 2, which instructs a multiplication operation to be carried out by using the internal registers A and B (see the instruction in the left-hand column in FIG. 2). The operation of the DSP according to this instruction is not different from the above described operation of the conventional DSP, and it takes three clocks to complete the arithmetic operations.

Next, an instruction in a central column of FIG. 7, i.e. "reg_a=reg_a+reg_b", means "Add together data stored in the internal register A and data stored in the internal register, and store a result of the addition in the internal register A". This instruction instructs arithmetic operations to be carried out by using the internal registers, and therefore output data from the delay elements 21 and 23 are selected by the respective selectors 22 and 24 to carry out the arithmetic operations. More specifically, this instruction is carried out by sequentially executing the following steps:

Step 1: The delay elements 21 and 23 deliver the output data from the internal registers A and B, respectively, after a delay of one clock;

Step 2: The output data from the delay elements 21 and 23 delivered respectively from the selectors 22 and 24 are added together by the ALU 12, and a result of the addition is stored in the accumulator ACC0; and Step 3: The data stored in the accumulator ACC0 is stored in the internal register A.

Thus, it also takes three clocks to carry out this instruction.

Next, an instruction in a right-hand column of FIG. 7, i.e. "reg_a=acc0=reg_c+reg_d", means "Add together data stored in the external register C and data stored in the external register D, and store a result of the addition in the internal register A". This instruction instructs the arithmetic operations to be carried out by using the external registers, and therefore output data from the internal registers A and B are selected by the respective selectors 22 and 24 to carry out the arithmetic operations. More specifically, this instruction is carried out by sequentially executing the following steps:

Step 1: Data stored in the external register C is transferred to the internal register A, and data stored in the external register D is transferred to the internal register B;

Step 2: The output data from the internal registers A and B delivered respectively through the selectors 22 and 24 are added together by the ALU 12, and a result of the addition is stored in the accumulator ACC0; and Step 3: The data stored in the accumulator ACC0 is stored in the internal register A.

Thus, it also takes three clocks to carry out this instruction.

As described above, according to the present embodiment, there is no difference in the number of clocks required to carry out arithmetic operations irrespective of whether the arithmetic operations are carried out by using the internal registers or by using the external registers, or irrespective of whether the arithmetic operations are multiplication operations or addition operations. This saves labor required of the programmer in determining the timing of start of execution of each instruction of a program he is preparing.

Figure 8:
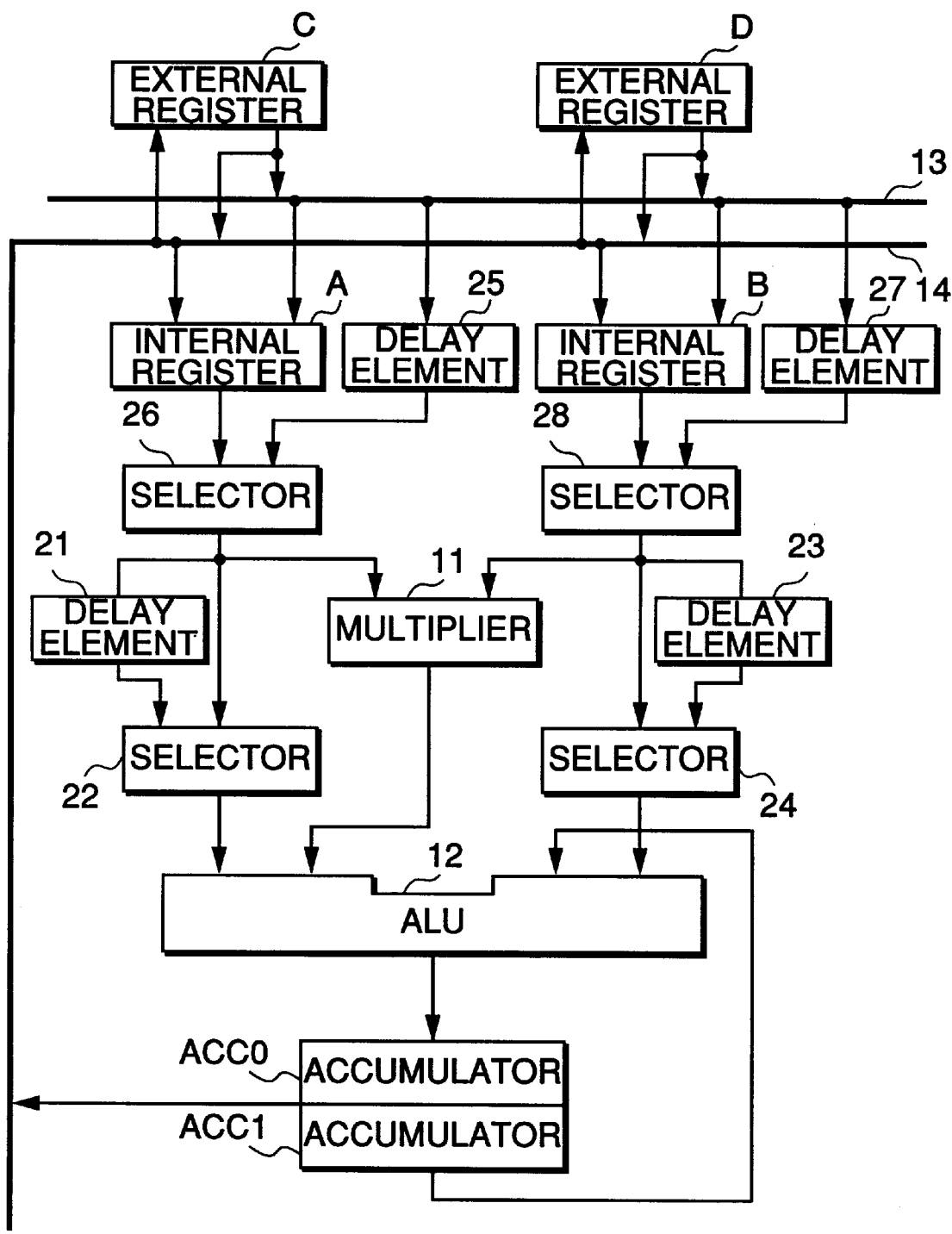
FIG. 8 is a block diagram showing the arrangement of a DSP according to a third embodiment of the invention.

FIG. 8 shows the arrangement of a DSP according to a third embodiment of the invention. This embodiment is distinguished from the second embodiment described above in that delay elements 25 and 27 as well as selectors 26 and 28 are additionally provided. The delay element 25 transfers data delivered to the bus 13 to the selector 26 after a delay of one clock, while the delay element 27 transfers data delivered to on the bus 14 to the selector 28 after a delay of one clock.

The selector 26 selects either output data from the internal register A or output data from the delay element 25 and supplies the same to the multiplier 11, the delay element 21, and the selector 22, and the selector 28 selects either output data from the internal register B or output data from the delay element 27 and supplies the same to the multiplier 11, the delay element 23, and the selector 24. Which data should be selected by the selectors 26 and 28 is determined depending on the kind of an instruction to be executed, i.e. when arithmetic operations are to be carried out by using the external registers, output data from the delay elements 25 and 27 are selected, while when arithmetic operations are to be carried out by using the internal registers A and B, output data from the internal registers A and B are selected.

According to the present embodiment, when an instruction for arithmetic operations using the external registers is carried out, output data from the external registers C and D are supplied not via the internal registers A and B but via the delay elements 25 and 27 to the ALU 12. As a result, the present embodiment is advantageous in that the arithmetic operations using the external registers can be carried out without updating the contents of the internal registers A and B.

A fourth embodiment of the invention will now be described, which is capable of efficiently passing data between a control processor and a DSP controlled by the control processor, to thereby enhance the whole performance of a digital signal processing system including the control processor and the DSP.

Figure 4:
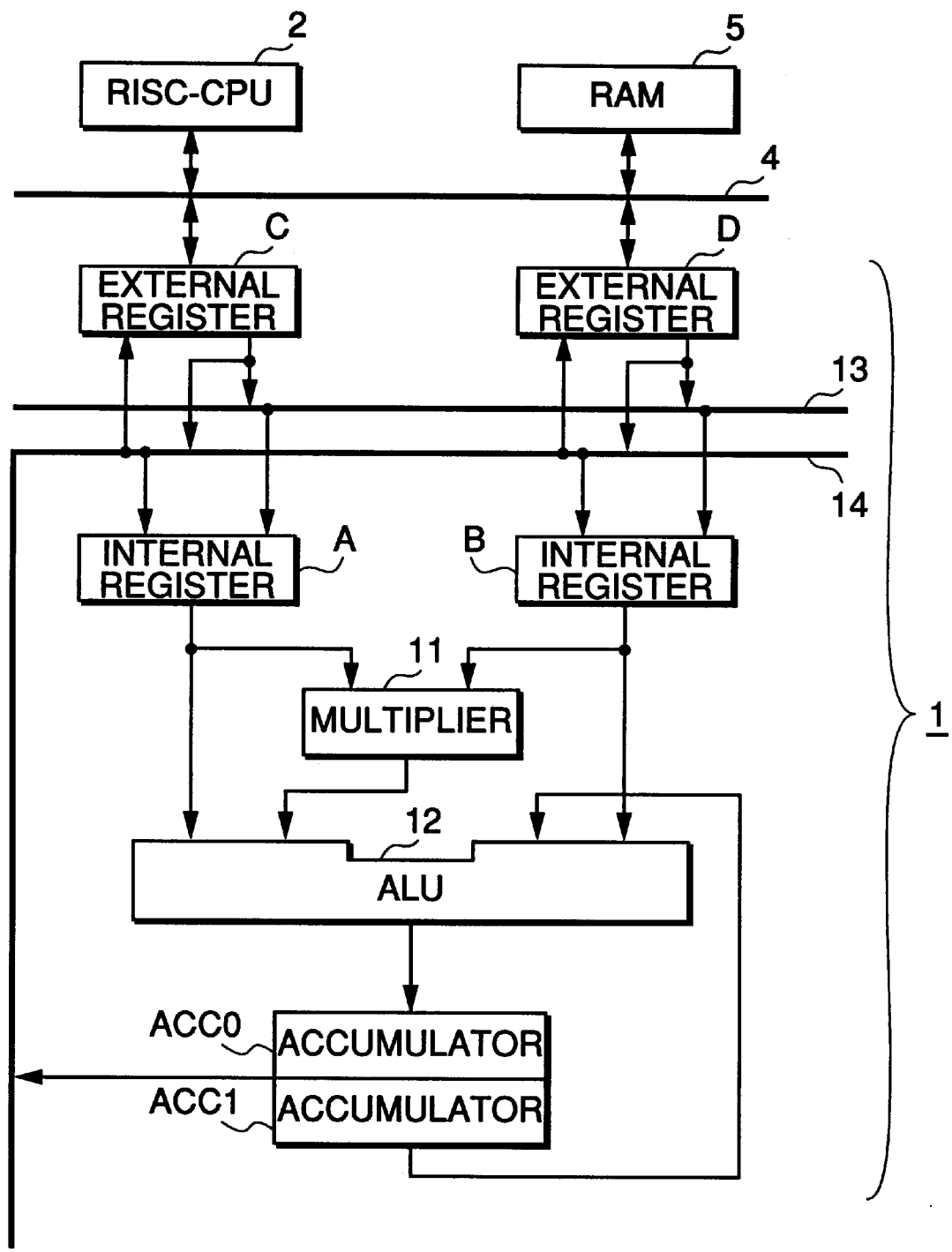
FIG. 4 is a block diagram showing the arrangement of another conventional digital signal processing system.
Figure 9:
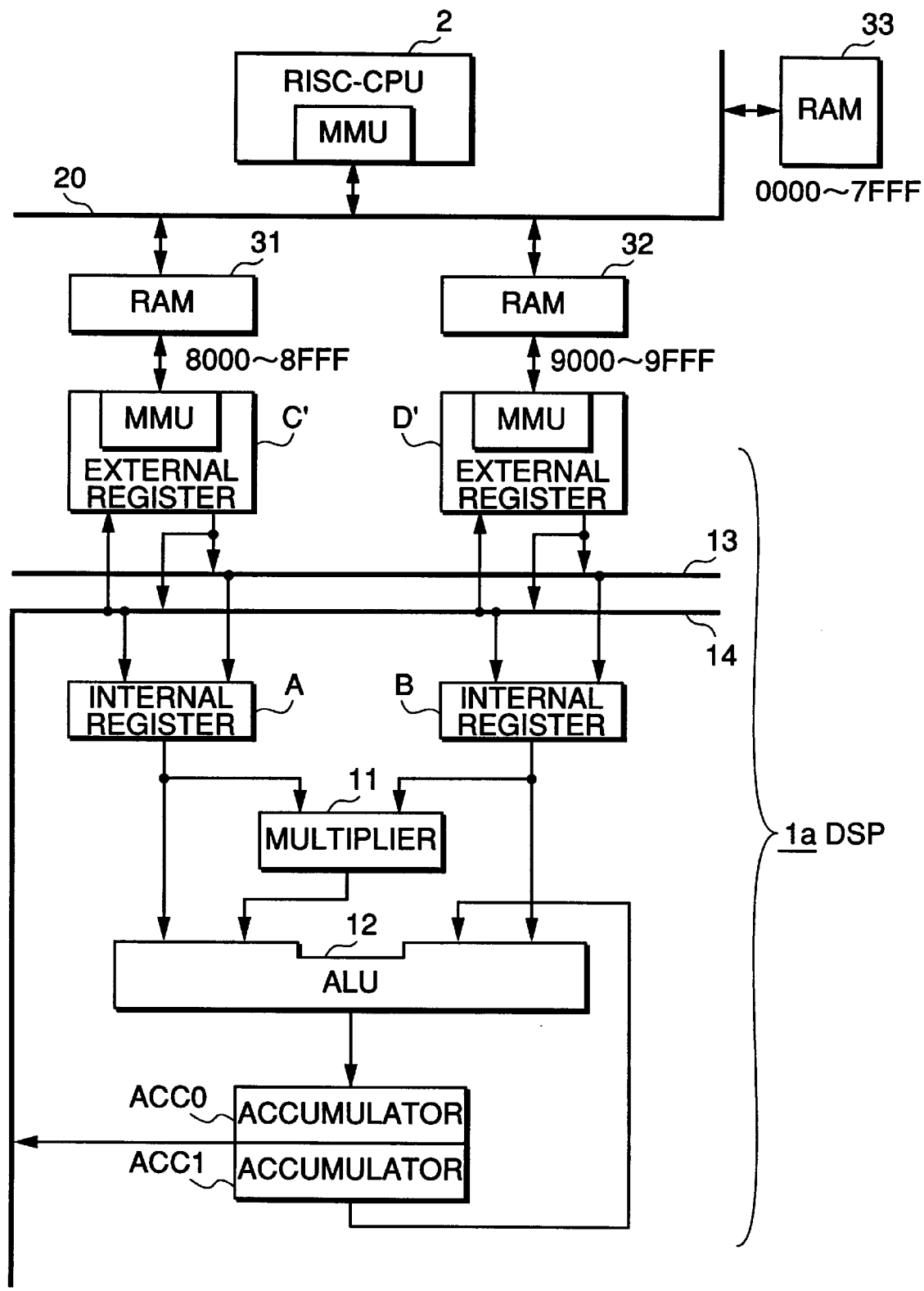
FIG. 9 is a block showing the arrangement of a digital signal processing system according to a fourth embodiment of the invention.

FIG. 9 shows the arrangement of a digital signal processing system according to the fourth embodiment. In the figure, component elements and parts corresponding to those appearing in FIG. 4 are designated by identical reference numerals, and detailed description thereof is omitted.

The digital signal processing system according to the present embodiment has three RAM's 31 to 33. The RAM 33 is used by the RISC-CPU 2 as a work RAM. The RAM's 31 and 32 are dual port RAM's and play the role of passing data between the RISC-CPU2 and the DSP 1.

One port of each of the RAM's 31 and 32 as well as the RAM 33 are connected via a common bus 20 to the RISC-CPU 2. These RAM's 31 to 33 are physically formed by respective three separate portions, but when viewed from the RISC-CPU 2, they constitute one RAM having contiguous addresses. In the illustrated example, the RAM 33 corresponds to addresses 0000 to 7FFF, the RAM 31 to addresses 8000 to 8FFF, and the RAM 32 to addresses 9000 to 9FFF. The RISC-CPU 2 passes data between these RAM's 31 to 33 via the common bus 20.

Figure 3:
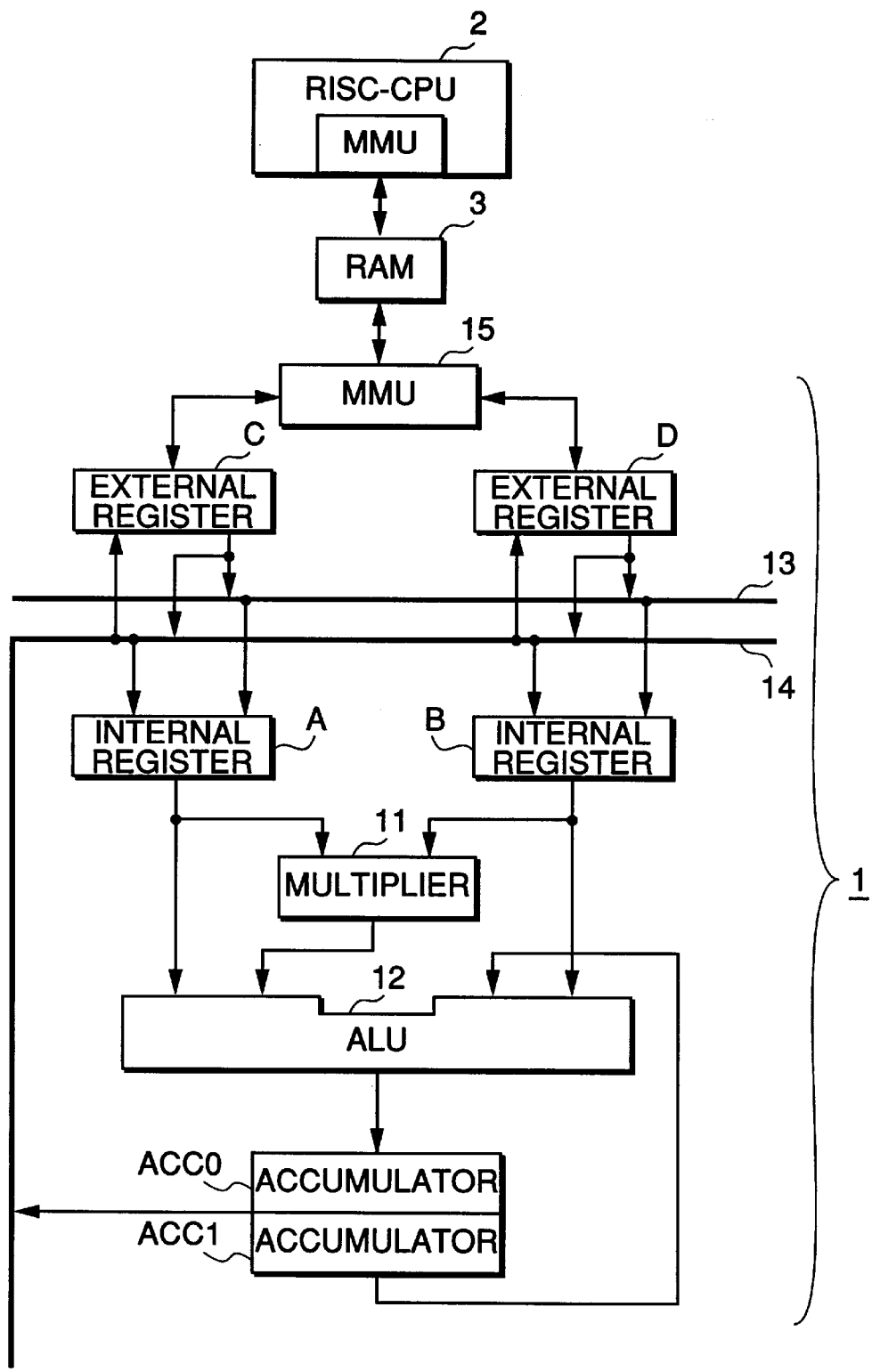
FIG. 3 is a block diagram showing the arrangement of a conventional digital signal processing system.

In a DSP 1*a* of the digital signal processing system, external registers C' and D' correspond to the external registers C and D employed in the conventional digital processing system described hereinabove with reference to FIGS. 3 and 4. However, the registers C' and D' of the present embodiment are each provided an MMU (memory management unit). The MMU of the external register C' is connected to another port of the RAM 31 which corresponds to the addresses 8000 to 8FFF, while the MMU of the external register D' is connected to another port of the RAM 32 which corresponds to the addresses 9000 to 9FFF. These MMU's control writing and reading of data by the RAM's 31 and 32, independently of each other. More specifically, when viewed from the RISC-CPU 2, the RAM's 31 and 32 form a single RAM together with the RAM 33, but when viewed from the DSP 1*a*, the RAM's 31 and 32 are two RAM's independent of each other.

Now, the operation of the digital signal processing system according to the present embodiment will be described. For instance, in the case where a filtering operation is carried out by the digital signal processing system, before the filtering operation is started, the RISC-CPU 2 stores in advance a sequence of coefficients required by the DSP 1*a* for its arithmetic operations in one of the RAM's 31 and 32 (in the RAM 32, for example).

Then, when the DSP 1*a* starts the filtering operation, the RISC-CPU 2 sequentially stores time-series data on which arithmetic operations are to be carried out in the other RAM 31.

On the DSP 1*a* side, the MMU of the external register C' sequentially reads a predetermined number of pieces of time-series data corresponding to a predetermined past time period from the RAM 31 whenever a predetermined sampling time period elapses, and the read data are temporarily stored in the external register C', and then transferred to the internal register A. On the other hand, in parallel with the above operation, the MMU of the register D' sequentially reads the predetermined sequence of coefficients from the RAM 32, and the read data are transferred by way of the external register D' to the internal register B. Thus, the multiplication/addition operations of data and coefficients transferred to the internal registers A and B are sequentially carried out to thereby perform the filtering operation.

The reading of data from the RAM 31 by the MMU of the external register C' and the reading of coefficients from the RAM 32 are carried out in parallel with each other and independently of each other. Therefore, the DSP 1a can read the data and coefficients at the same time, which enables the multiplication/addition operations to be efficiently carried out.

A fifth embodiment of the invention will now be described, which incorporates essential elements of the first, second, and fourth embodiments to thereby enhance the whole performance of a digital signal processing system including the control processor and the DSP.

Figure 10:
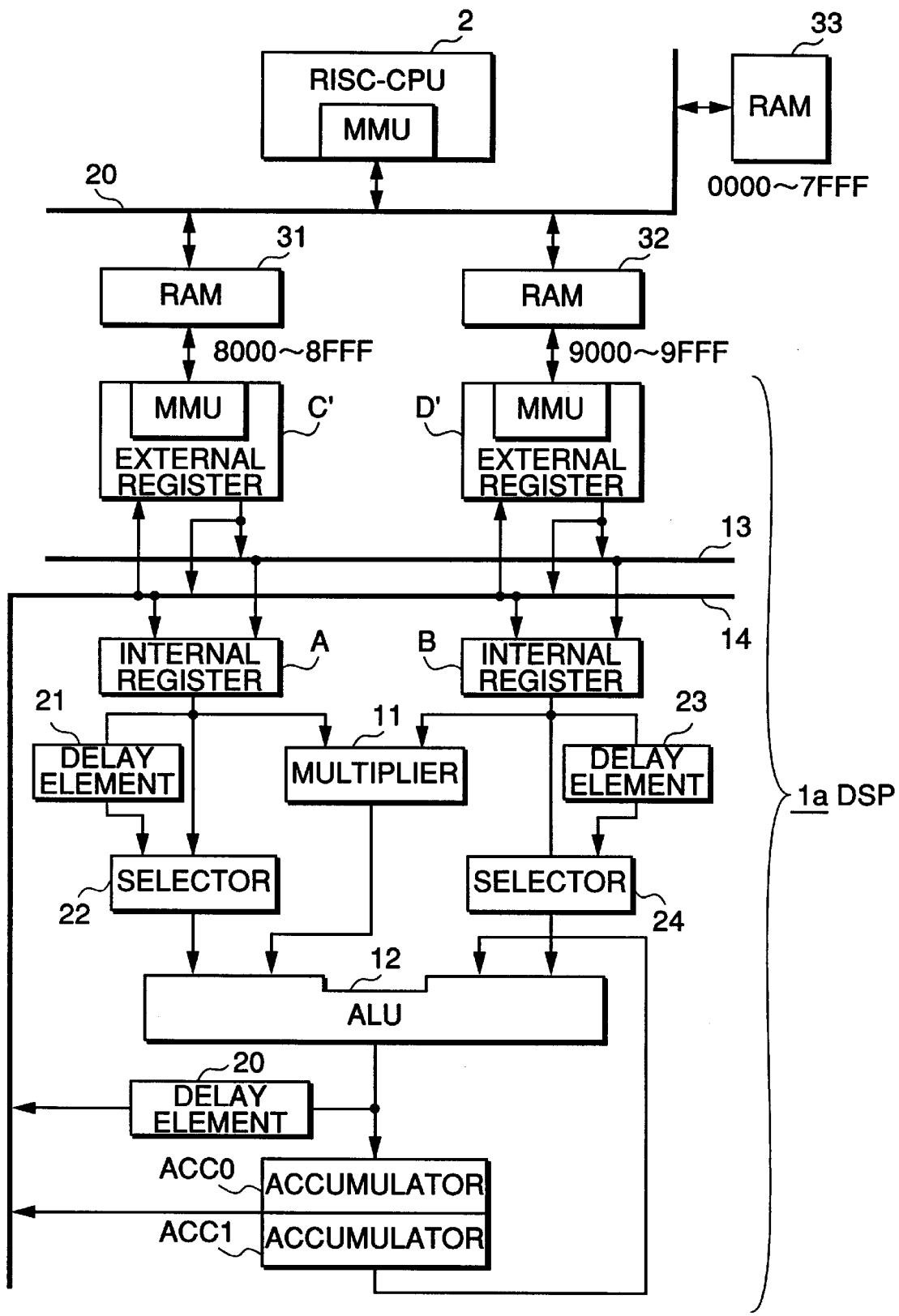
FIG. 10 is a block showing the arrangement of a digital signal processing system according to a fifth embodiment of the invention.

More specifically, as shown in FIG. 10, this embodiment is distinguished from the fourth embodiment described above in that it additionally incorporates a bypass path comprised of the delay element 20 of the first embodiment shown in FIG. 5, and the delay elements 21, 23 and the selectors 22, 24 of the second embodiment shown in FIG. 6.

According to this embodiment, all the advantageous effects obtained by the first, second, and fourth embodiments described above can be obtained.

The embodiments described heretofore are illustrated only by way of example, and not by way of limitation, and can be modified as desired within the scope of the invention.

What is claimed is:

1. A digital signal processor comprising:
   an arithmetic operation unit having an output bit width of N;
   a bus of bit width M that transfers data to be processed by said arithmetic operation unit and results of arithmetic processing by said arithmetic operation unit, wherein M<N;
   at least one accumulator that holds said results of said arithmetic processing by said arithmetic operation unit and delivers said results to said bus, wherein said at least one accumulator has a bit storage capacity N; and
   a bypass device that delivers said results to said bus by bypassing said at least one accumulator, wherein said bypass device comprises a delay element that delays delivery of said results of said arithmetic processing by said arithmetic operation unit to said bus, said delay element delivering said results to said bus at a same timing that said results are delivered by way of said at least one accumulator, and wherein said delay element has a bit storage capacity M.

2. A digital signal processor according to claim 1, including at least one external register connected to said bus, for storing said data to be processed by said arithmetic operation unit, said arithmetic operation unit having at least one internal register connected to said at least one external register via said bus, said data to be processed by said arithmetic operation unit being transferred from said at least one external register to said at least one internal register by way of said bus.

3. A digital signal processor according to claim 2, wherein said digital signal processor carries out a filtering operation, said at least one external register comprising a plurality of external registers, said at least one internal register comprising a plurality of internal registers, one of said external registers and one of said internal registers each storing time-series data, while another one of said external registers and another one of said internal registers each storing filter coefficients.

4. A digital signal processor comprising:
   an arithmetic operation unit having an output bid width N;
   a bus of bit width M that transfers data to be processed by said arithmetic operation unit and results of arithmetic processing by said arithmetic operation unit, wherein M<N;
   at least one accumulator that holds said results of said arithmetic processing by said arithmetic operation unit and delivers said results to said bus, wherein said accumulator has a bit storage capacity N; and
   a bypass device that delivers said results by bypassing said at least one accumulator, wherein said bypass device comprises a delay element that delays delivery of said results of said arithmetic processing by said arithmetic operation unit to said bus, said delay element delivering said results to said bus at a same timing that said results are delivered by way of said at least one accumulator, and wherein said delay element has a bit storage capacity M.

5. A digital signal processor comprising:
   an arithmetic operation unit having an output bid width N;
   a bus of bit width M that transfers data to be processed by said arithmetic operation unit and results of arithmetic processing by said arithmetic operation unit, wherein M<N;
   at least one accumulator that holds said results of said arithmetic processing by said arithmetic operation unit and delivers said results to said bus, wherein said at least one accumulator has a bit storage capacity N; and
   a bypass device that delivers said results to said bus by bypassing said at least one accumulator, wherein said bypass device comprises a delay element that delays delivery of said results of said arithmetic processing by said arithmetic operation unit to said bus, and wherein said delay element has a bit storage capacity M.

6. A digital signal processor according to claim 5, wherein said delay element delivers said results to said bus at a same timing that said results would be delivered by way of said at least one accumulator.

7. A digital signal processor according to claim 6, further comprising at least one external register connected to said bus, for storing data to be processed by said arithmetic operation unit, said arithmetic operation unit having at least one internal register connected to said at least on external register via said bus, said data to be processed by said arithmetic operation unit being transferred from said at least one external register to said at least one internal register by way of said bus.

8. A digital signal processor according to claim 7, wherein said digital signal processor carries out a filtering operation, said at least one external register comprising a plurality of external registers, said at least one internal register comprising a plurality of internal registers, one of said external registers and one of said internal registers each storing time-series data, while another one of said external registers and another one of said internal registers each storing filter coefficients.

9. A digital signal processor comprising:
   an arithmetic operation unit having an output bit width N;
   a bus of bit width M that transfers data to be processed by said arithmetic operation unit and results of arithmetic processing by said arithmetic operation unit, wherein M<N;
   at least one accumulator that holds said results of said arithmetic processing by said arithmetic operation unit and delivers said results to said bus, wherein said accumulator has a bit storage capacity N; and
   a bypass device that delivers said results by bypassing said at least one accumulator, wherein said bypass device comprises a delay element that delays delivery of said results of said arithmetic processing by said arithmetic operation unit to said bus, and wherein said delay element has a bit storage capacity M.

10. A digital signal processor according to claim 9, wherein said delay element delivers said results to said bus at a same timing that said results would be delivered by way of said at least one accumulator.

11. A digital signal processor according to claim 10, further comprising at least one external register connected to said bus, for storing data to be processed by said arithmetic operation unit, said arithmetic operation unit having at least one internal register connected to said at least on external register via said bus, said data to be processed by said arithmetic operation unit being transferred from said at least one external register to said at least one internal register by way of said bus.

12. A digital signal processor according to claim 11, wherein said digital signal processor carries out a filtering operation, said at least one external register comprising a plurality of external registers, said at least one internal register comprising a plurality of internal registers, one of said external registers and one of said internal registers each storing time-series data, while another one of said external registers and another one of said internal registers each storing filter coefficients.

* * * * *